(12) United States Patent
Armstrong et al.

(10) Patent No.: US 10,173,244 B2
(45) Date of Patent: Jan. 8, 2019

(54) TUNABLE RESONANCE IN A RESONATING GAS SEISMIC SOURCE

(71) Applicants: PGS Geophysical AS, Oslo (NO); Geospectrum Technologies Inc., Dartmouth (CA)

(72) Inventors: Bruce Armstrong, Dartmouth (CA); Paul Yeatman, Dartmouth (CA); Øystein Traetten, Asker (NO); Mattias Oscarsson, Oslo (NO); Rune Voldsbekk, Orammen (NO); Rune Tønnessen, Lummendalen (NO)

(73) Assignees: PGS Geophysical AS, Oslo (NO); Geospectrum Technologies Inc., Dartmouth, NS (CA)

( * ) Notice: Subject to any disclaimer, the term of this patent is extended or adjusted under 35 U.S.C. 154(b) by 290 days.

(21) Appl. No.: 15/300,084

(22) PCT Filed: Oct. 30, 2014

(86) PCT No.: PCT/EP2014/073326
§ 371 (c)(1),
(2) Date: Sep. 28, 2016

(87) PCT Pub. No.: WO2015/063210
PCT Pub. Date: May 7, 2015

(65) Prior Publication Data
US 2017/0178613 A1 Jun. 22, 2017

Related U.S. Application Data

(60) Provisional application No. 61/898,246, filed on Oct. 31, 2013, provisional application No. 61/898,245, (Continued)

(51) Int. Cl.
*G01V 1/135* (2006.01)
*B06B 1/06* (2006.01)
(Continued)

(52) U.S. Cl.
CPC .............. *B06B 1/0611* (2013.01); *G01V 1/04* (2013.01); *G01V 1/135* (2013.01); *G01V 1/145* (2013.01);
(Continued)

(58) Field of Classification Search
CPC .. B01B 1/0611; G01V 1/135; G01V 1/15904; G01V 1/38; G10K 9/04; G10K 9/125; G10K 11/04
See application file for complete search history.

(56) References Cited

U.S. PATENT DOCUMENTS

| | | | | |
|---|---|---|---|---|
| 3,978,940 A | * | 9/1976 | Bouyoucos | G01V 1/135 181/120 |
| 4,135,142 A | * | 1/1979 | Percy | G10K 11/04 367/171 |

(Continued)

OTHER PUBLICATIONS

International Search Report for PCT Application No. PCT/EP2014/073327, dated Apr. 9, 2015.
(Continued)

*Primary Examiner* — Krystine E Breier

(57) ABSTRACT

A system may include a conduit coupled between a marine seismic source and a gas reservoir external to the seismic source. The conduit may have at least one adjustable dimension for changing a resonance frequency of the system. The system may be utilized in a method of marine seismic surveying.

20 Claims, 15 Drawing Sheets

Related U.S. Application Data filed on Oct. 31, 2013, provisional application No. 61/898,234, filed on Oct. 31, 2013.

(51) Int. Cl.
| | |
|---|---|
| G01V 1/145 | (2006.01) |
| G01V 1/02 | (2006.01) |
| G10K 9/04 | (2006.01) |
| G10K 9/125 | (2006.01) |
| G01V 1/04 | (2006.01) |
| G01V 1/38 | (2006.01) |
| G10K 11/04 | (2006.01) |

(52) U.S. Cl.
CPC ............... *G01V 1/159* (2013.01); *G01V 1/38* (2013.01); *G10K 9/04* (2013.01); *G10K 9/125* (2013.01); *G10K 11/04* (2013.01)

(56) References Cited

U.S. PATENT DOCUMENTS

| | | | |
|---|---|---|---|
| 4,142,171 A * | 2/1979 | Pickens | G10K 9/10 367/13 |
| 5,233,570 A | 8/1993 | Donskoy | |
| 5,894,451 A | 4/1999 | Dejaco | |
| 6,002,648 A | 12/1999 | Ambs | |
| 8,384,270 B2 * | 2/2013 | Huang | G10K 11/04 181/200 |
| 8,441,892 B2 * | 5/2013 | Morozov | G01V 1/145 181/120 |
| 2003/0160546 A1 | 8/2003 | Osborn | |
| 2009/0268554 A1 | 8/2009 | Armstrong | |
| 2012/0051188 A1 | 3/2012 | Graber | |
| 2013/0148822 A1 * | 6/2013 | Bithell | H04R 3/04 381/97 |

OTHER PUBLICATIONS

Woollett, Ralph S.; "Underwater Helmholtz-Resonator Transducers: General Design Principles", NUSC Technical Report, Jul. 5, 1977.

International Search Report for PCT Application No. PCT/EP2014/073325, dated Apr. 9, 2015.

International Search Report for PCT Application No. PCT/EP2014/073326, dated Apr. 29, 2015.

\* cited by examiner

TUNABLE RESONANCE IN A RESONATING GAS SEISMIC SOURCE

CROSS-REFERENCE TO RELATED APPLICATIONS

This application is a US national phase of PCT/EP2014/073326 filed Oct. 30, 2014. The PCT/EP2014/073326 application claims the benefit of Provisional Patent Application No. 61/898,234 filed Oct. 31, 2013, Provisional Patent Application No. 61/898,245 filed Oct. 31, 2013, and Provisional Patent Application No. 61/898,246 filed Oct. 31, 2013. All these applications are hereby incorporated by reference in their entireties.

BACKGROUND

In the oil and gas exploration industry, various techniques of marine geophysical surveying are commonly used in the search for subterranean formations. Marine geophysical surveying techniques yield knowledge of the subsurface structure of the Earth, which is useful for finding and extracting hydrocarbon deposits such as oil and natural gas. Seismic surveying and electromagnetic surveying are two of the well-known techniques of marine geophysical surveying. Seismic surveying and electromagnetic surveying may be used separately or jointly in a survey operation.

During a typical marine seismic survey, a marine seismic source may be towed behind a survey vessel at a particular water depth. The marine seismic source may emit acoustic energy waves in a generally downward direction. The downward traveling acoustic waves may travel through a body of water and be reflected by the underlying Earth formations. The reflected acoustic waves may be detected by sensors such as hydrophones. Information regarding the Earth formations may be derived accordingly.

As marine geophysical operations continue to explore Earth formations beneath increasing water depths, there is a need for a marine seismic source having an operating frequency range (e.g., a range between about 1 Hz and about 10 Hz) that may be applicable to corresponding ranges of operating parameters such as water temperatures, pressures, and/or acoustic power output.

DETAILED DESCRIPTION

Figure 1:
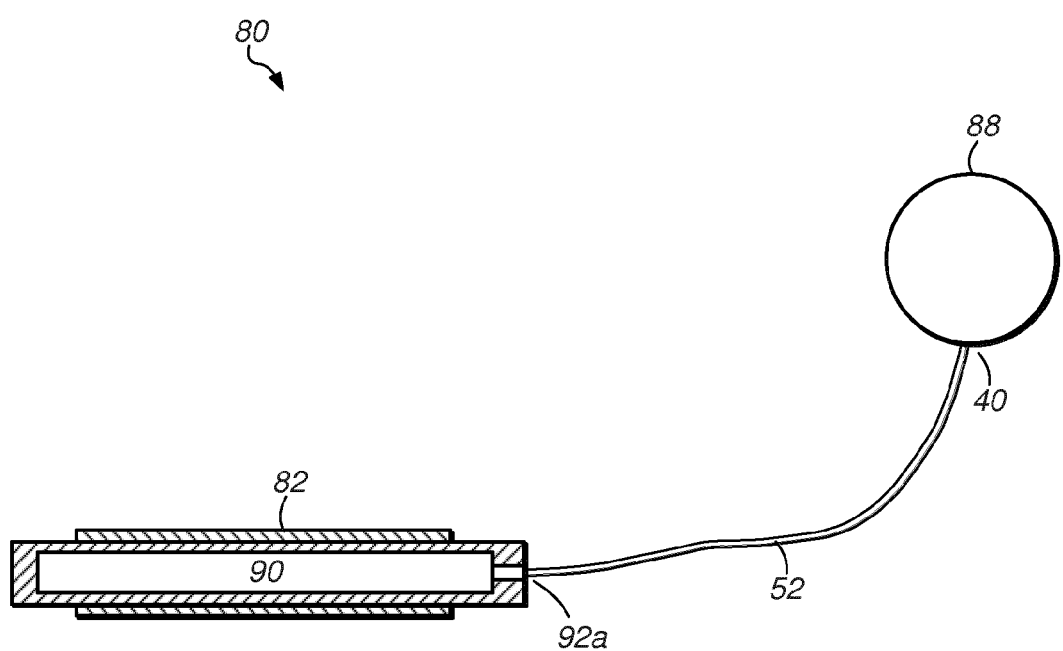
FIG. 1 illustrates an embodiment of a system according to the disclosure herein.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various devices, units, circuits, or other components may be described or claimed as "configured to," "usable to," or "operable to" perform a task or tasks. In such contexts, "configured to," "usable to," and "operable to" are each used to connote structure by indicating that the devices/units/circuits/components include structure that performs the task or tasks during operation. As such, the device/unit/circuit/component can be said to be configured to, usable to, or usable to perform the task even when the specified device/unit/circuit/component is not currently operational (e.g., is not on or in operation). The devices/units/circuits/components used with the "configured to," "usable to," or "operable to" language may include electronic hardware—for example, circuits, memory storing program instructions executable to implement the operation, etc.—mechanical devices, or other types of structure. Reciting that a device/unit/circuit/component is "configured to," "usable to," or "operable to" perform one or more tasks is expressly intended not to invoke 35 U.S.C. § 112(f), for that device/unit/circuit/component.

In a marine seismic survey, which is generally a seismic survey conducted in a marine environment (which may include saltwater, freshwater, and/or brackish water environments), one or more marine seismic sources may be utilized to generate acoustic energy. The acoustic energy may travel downward through the water and through the Earth formations underlying the water bottom. The acoustic impedance boundaries in the Earth formations may reflect, at least in part, the seismic waves that travel through the formations. The reflected seismic wave may in turn travel upwards. Seismic sensors (e.g., hydrophones or geophones) may capture such reflected seismic waves. These seismic sensors may convert the captured seismic waves into signals such as optical or electrical signals. The electrical or optical signals may then be interpreted to provide information both as to the composition and the structure of the various subsurface Earth formations under the water bottom. Such information may be used, for example, to determine the possibility that such Earth formations may contain mineral deposits including hydrocarbons.

One type of marine seismic source often used in marine geophysical surveying operations includes an impulsive type source such as an air gun, or an array of air guns. The frequency content of such sources is generally controllable only to a small degree, principally by altering the charge chamber sizes in an air gun array. The impulsive type marine seismic sources generally produce a limited acoustic energy output in a frequency range of about 1-10 Hz. Particularly over a frequency range of about 1 Hz to about 5 Hz, the acoustic energy output of the impulsive type sources is generally considered limited.

Another type of marine seismic source may include an acoustic vibratory source. Such a source may include certain pneumatic or hydraulic components. A typical acoustic vibratory source may employ piezoelectric or magnetostrictive material. Acoustic vibratory sources are generally known for better frequency control than the impulsive type of sources. The acoustic vibratory sources may produce a limited acoustic energy output at a frequency range of about 1-100 Hz. Both types of marine seismic sources may be employed in a marine seismic survey.

In an acoustic vibratory source that includes a piezoelectric component, mechanical vibration of the acoustic vibratory source may be created by applying a voltage to the piezoelectric component. The electric field created may cause the piezoelectric material to deform in proportion to the voltage, and the deformation may be used to create vibrations in the vibratory source. The inverse may also occur. A force, such as that created by an acoustic wave, may create a deformation in the piezoelectric material, and this deformation may in turn create an electric field. When used in this fashion, the device is frequently called a hydrophone.

FIG. 1 illustrates a non-limiting embodiment of system 80. System 80 may include marine seismic source 82. Marine seismic source 82 may include various types of acoustic vibratory sources, sound projectors, and other such devices.

Figure 2A:
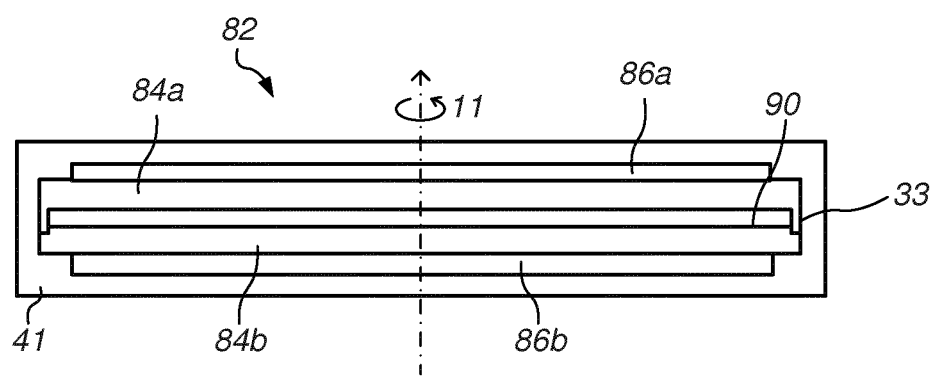
FIG. 2A illustrates a cross-sectional view of a marine seismic source according to an embodiment of the disclosure herein.

A cross-sectional view of a non-limiting embodiment of marine seismic source 82 is illustrated in FIG. 2A. As shown, marine seismic source 82 may be in the form of an electromechanical device such as a "bender" (may also be called a "flexural-disc projector"). In some embodiments, marine seismic source 82 may include flexible waterproof material 41 (e.g., plastic or rubber). In other embodiments, however, flexible waterproof material 41 may be omitted from marine seismic source 82. However, the disclosure is not limited to marine seismic source 82 being an electromechanical device or a bender. Marine seismic source 82 may include other types of acoustic vibratory sources, sound projectors, and other such devices.

In this particular embodiment, marine seismic source 82 may include components such as a pair of discs 84a and 84b. Discs 84a and 84b may each be of a circular shape, an elliptic shape, or another shape. Discs 84a and 84b may be made from a material with electrical conductivity properties, such as metal (e.g., aluminum, steel, etc.). Discs 84a and 84b may be made from a same material in one embodiment. Yet in another embodiment, discs 84a and 84b may be made from different materials that exhibit electrical conductivity properties.

Marine seismic source 82 may also include components such as a pair of piezoelectric components 86a and 86b. Piezoelectric components 86a and 86b may be made from a ceramic material or other materials exhibiting piezoelectricity. Piezoelectric components 86a and 86b may each be in a circular shape, an elliptic shape, or another shape, either contiguous or non-contiguous. Piezoelectric components 86a and 86b may be made from a same piezoelectric material or different piezoelectric materials. In this embodiment illustrated in FIG. 2A, areas of piezoelectric components 86a and 86b may be smaller than areas of discs 84a and 84b. A total mass of marine seismic source 82 would include a mass of discs 84a and 84b and a mass of piezoelectric components 86a and 86b.

Piezoelectric component 86a may be attached to disc 84a, and piezoelectric component 86b may be attached to disc 84b. In one particular embodiment, piezoelectric component 86a may be attached to disc 84a by an adhesive such as epoxy or other similar components. However, there is no limitation as to how piezoelectric components 86a and 86b may be attached to discs 84a and 84b, respectively. As used herein, the words "attach," or "attached" and other derivations thereof mean a connection between components, whether direct or indirect.

Figure 2B:
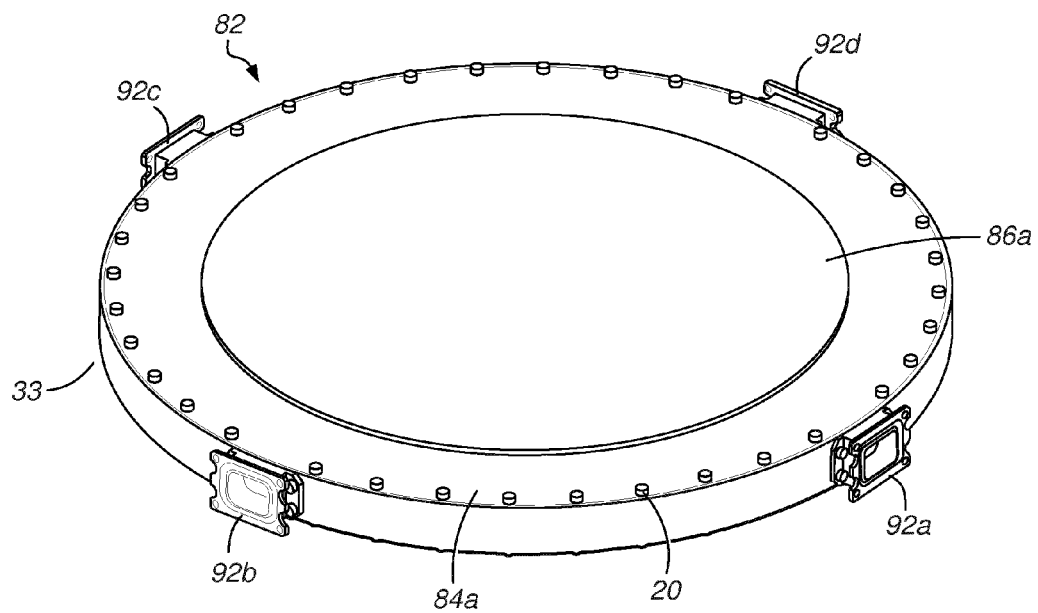
FIG. 2B illustrates a top view of a marine seismic source according to an embodiment of the disclosure herein.

A pair of discs 84a and 84b (having, for example, attached piezoelectric components 86a and 86b) may be held together to form cavity 90 between the discs. Cavity 90 is included in marine seismic source 82. In one non-limiting embodiment, discs 84a and 84b may be secured together by hoop 33 illustrated in FIG. 2A. In that embodiment, hoop 33 may be secured to discs 84a and 84b by one or more bolts 20 illustrated in FIG. 2B. Cavity 90 may be bounded by the pair of discs 84a and 84b and held in place by hoop 33 that is included in marine seismic source 82. Hoop 33 may be configured to maintain a separation (e.g., a gap) between the pair of discs 84a and 84b (having, for example, the pair of piezoelectric components 86a and 86b) and facilitate a movement of marine seismic source 82. For example, when electric energy is applied to piezoelectric components 86a and 86b, discs 84a and 84b may move or push against hoop 33. Cavity 90 may include ports such as 92a, 92b, 92c, and 92d illustrated in FIG. 2B. These ports may serve as apertures for transporting fluid or gas to and from cavity 90. Each of such ports may be configured to facilitate the resonating gas flow to pass between cavity 90 and gas reservoir 88. In one non-limiting embodiment, ports 92a, 92b, 92c, and 92d illustrated in FIG. 2B may be connected to one another which may then be connected to gas reservoir 88.

Cavity 90 may be configured to contain a volume of gas such as air or any other compressible fluid or gaseous substances. Although compressible fluids may be employed, the contents of cavity 90 are referred to here as a "gas" for simplicity. The volume of gas within cavity 90 may be dependent on the volume of cavity 90, which in turn would depend on dimensions of cavity 90 (e.g., diameter, length, height, etc.). A skilled artisan may refer to the volume of gas contained or restricted within cavity 90 as "trapped" gas (in the case that cavity 90 contains a volume of air, it may be referred to as "trapped air," for example) when the volume of gas is not communicative with objects (e.g., another volume of gas) external to cavity 90. The volume of gas contained within cavity 90 may serve, among other purposes, as a compliant medium to reduce any impedance to the vibration amplitude of discs 84a and 84b.

In some embodiments, the volume of gas within cavity 90 may be pressurized. In marine applications, pressurizing and maintaining the volume of gas within cavity 90 at an ambient hydrostatic pressure at an operating water depth may protect marine seismic source 82 from collapsing from the ambient hydrostatic pressure.

In the embodiment illustrated by FIG. 2A, when electric energy such as a sinusoidal voltage at a driving frequency is applied to piezoelectric components 86*a* and 86*b*, discs 84*a* and 84*b* may bend, flex or otherwise be distorted in proportion to the electric energy (e.g., the sinusoidal voltage). The resulting vibration and acoustic output may be at the driving frequency of the voltage being applied. In this embodiment, discs 84*a* and 84*b* may bend, flex, or be otherwise distorted axially along axis of symmetry 11. For example, when a voltage is applied, discs 84*a* and 84*b* may bend, flex, or be otherwise distorted axially along axis of symmetry 11 at a driving frequency of the applied voltage.

The vibration of discs 84*a* and 84*b* may also cause a dynamic pressure variation in the volume of gas within cavity 90. The dynamic pressure may be greater when the volume of gas within cavity 90 is trapped or restricted (e.g., not communicative with other objects external to cavity 90). The dynamic pressure may oppose the vibration of discs 84*a* and 84*b* and the acoustic energy output of marine seismic source 82 may be reduced.

Returning now to FIG. 1, system 80 may include gas reservoir 88. In the non-limiting embodiment illustrated in FIG. 1, gas reservoir 88 may be disposed external to marine seismic source 82. Gas reservoir 88 may include a cavity or container which may be made from a material such as, without limitation, metal, alloy, or polymer. Gas reservoir 88 may be configured to contain a volume of gas such as air or other gaseous substances. The volume of gas contained in gas reservoir 88 may be of a same or different value of the volume of gas within cavity 90. The volume of gas would depend on a volume of gas reservoir 88, which in turn would be based on dimensions of gas reservoir 88 (e.g., diameter, length, height, etc.).

In the non-limiting embodiment illustrated in FIG. 1, gas reservoir 88 may include aperture 40. Yet in other embodiments, gas reservoir 88 may include more than one aperture (not shown in FIG. 1). Aperture 40 may or may not include a valve or other device that may regulate, direct or control the flow of gas to and from gas reservoir 88. In the embodiments in which gas reservoir 88 may include more than one aperture, any number of valves may be included, or valves may be omitted entirely.

In the non-limiting embodiment illustrated in FIG. 1, gas reservoir 88 and marine seismic source 82 may be coupled via conduit 52 to permit a resonating gas flow to pass therebetween. As a result of such coupling, the volume of gas within gas reservoir 88 may be in fluid communication with the volume of gas within cavity 90. A total volume of gas within system 80 may include the volume of gas within cavity 90 and the volume of gas within gas reservoir 88.

In the embodiment illustrated in FIG. 1, conduit 52 may be coupled between marine seismic source 82 and gas reservoir 88. One end of conduit 52 may be coupled to cavity 90 of marine seismic source 82. For example, one end of conduit 52 may be coupled to port 92*a* of cavity 90 illustrated in FIG. 1. The other end of conduit 52 may be coupled gas reservoir 88 (e.g., via aperture 40).

Conduit 52 may be a hose, a pipe or other suitable apparatus. In some embodiments, conduit 52 may have a generally circular cross-sectional area that may be defined by a diameter, while in other embodiments conduit 52 may have a cross-sectional area defined by any other suitable geometry. A volume of conduit 52 would depend on dimensions of conduit 52 (e.g., cross-sectional area, length, etc.). A volume of conduit 52 would depend on dimensions of conduit 52 (e.g., diameter, length, etc.). More than one conduit 52 may be included in system 80. For example, a plurality of conduits 52 may be arranged in an array. Marine seismic source 82 and gas reservoir 88 may be coupled via the plurality of conduits. For example, FIG. 3D (to be discussed in further detail in other portions of the specification) shows an embodiment in which an array of four conduits 54*a*, 54*b*, 54*c*, and 54*d* joining into conduit 52. A total volume of several conduits 52 would be based on the dimensions and number of conduits 52. The number of conduits 52 and other components shown in the figures is only for purposes of illustration and is not a limitation on the number of components that may be used in any particular embodiment. Moreover, other shapes, configurations, and geometries of conduit 52 are specifically contemplated and included here.

A total volume of gas within system 80 may be a sum of the volume of gas within conduit 52 and the respective portions of gas within gas reservoir 88 and cavity 90. In other words, the total volume of gas within system 80 may include three portions: a first portion within gas reservoir 88, a second portion within cavity 90, and a third portion within conduit 52.

As discussed earlier, system 80 may include, either as one form of marine seismic source 82 or a component included in marine seismic source 82, an electromechanical device that is configured to resonate the volume of gas within system 80 in response to an input of electric energy (e.g., applying a voltage to the electromechanical device or the electromechanical device receiving a voltage). That is, the volume of gas may be resonated within system 80 by the energy imparted to the volume of gas based on the vibration of discs 84*a* and 84*b*. In one non-limiting embodiment, marine seismic source 82 may be in the form of an electromechanical device such as a bender which may include at least one piezoelectric component. In the embodiment illustrated in FIG. 2, the electromechanical device may include cavity 90 which is disposed in between discs 84*a* and 84*b*, and piezoelectric components 86*a* and 86*b* attached to discs 84*a* and 84*b*. The electromechanical device may be operable to actuate and to cause a resonance in a gas flow passing between marine seismic source 82 and gas reservoir 88. In this non-limiting embodiment, when marine seismic source 82 actuates, a resonating gas flow may pass between cavity 90 and gas reservoir 88 through conduit 52. In this and other embodiments, a resonance frequency (or resonance) of the volume of gas within system 80 may be dependent on factors including dimensions (e.g., diameter and/or length) of conduit 52.

Specifically, when marine seismic source 82 includes an electromechanical device, the electromechanical device may include one or more piezoelectric components. The electromechanical device may include, for example, two piezoelectric components such as 86*a* and 86*b* illustrated in FIG. 2A. Upon piezoelectric components 86*a* and 86*b* receiving electric energy, the electromechanical device may vibrate. Marine seismic source 82 may operate (e.g., be driven) at a frequency of the electric energy. The vibration may cause the volume of gas within cavity 90 to flow in and out between cavity 90 and gas reservoir 88. When piezoelectric components 86*a* and 86*b* operate (e.g., are driven) at the resonance frequency of the volume of gas flowing between cavity 90 and gas reservoir 88, the dynamic pressure within cavity 90 may peak. The resonance frequency of the volume of gas resonating between cavity 90 and gas reservoir 88 may be determined based on dimensions such as a length and a cross-sectional area of conduit 52. The resonance frequency of the volume of gas resonating between cavity 90 and gas reservoir 88 may also be affected by other parameters. Such other parameters may include a volume of cavity 90, a volume of gas reservoir 88, a length, cross-sectional area and/or quantity of other components in the flow path of the volume of gas (e.g. port 92a), and ambient pressure. A suitable choice of these aforementioned parameters may cause marine seismic source 82 to generate acoustic energy at a particular frequency range (e.g., below 10 Hz). The particular frequency range would in turn determine a range of corresponding advantageous water depth for operating marine seismic source 82. For example, when marine seismic source 82 is operating at a frequency of 5 Hz, the wavelength of an acoustic wave may be approximately 300 meters (e.g., based on a sound velocity in water of approximately 1,500 m/s) and the advantageous operating depth may therefore be approximately wavelength/4 or approximately 75 meters.

Figure 3A:
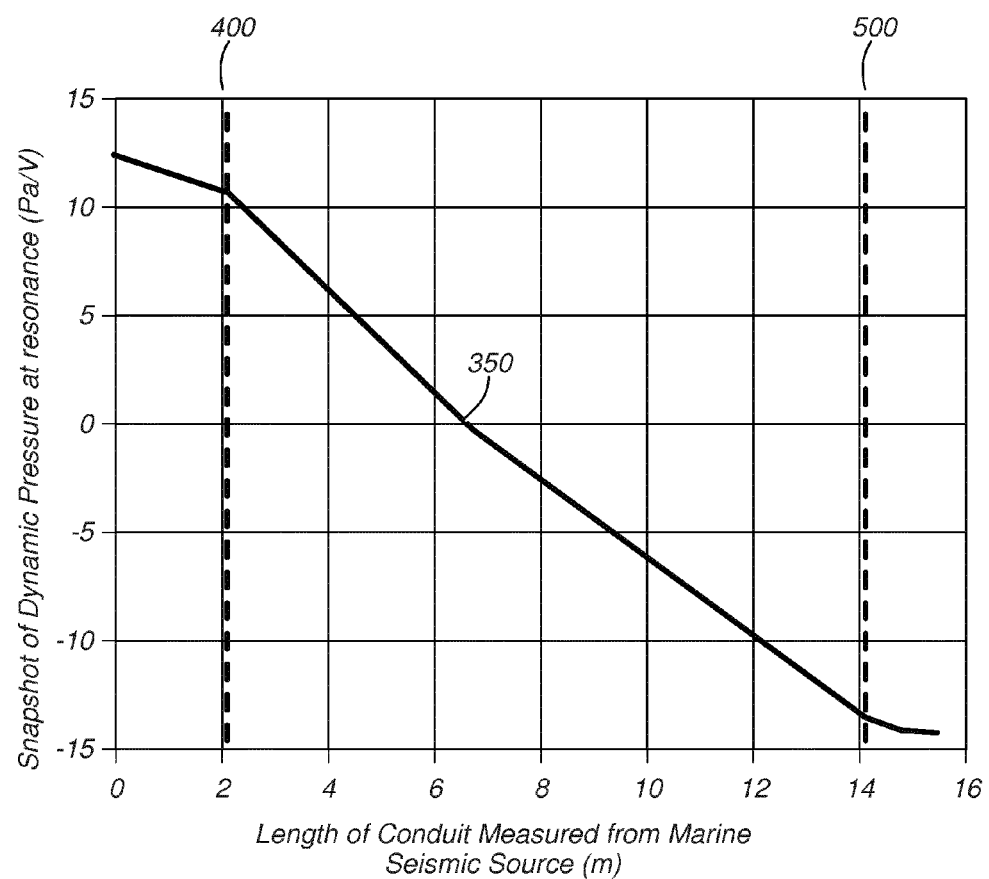
FIG. 3A illustrates a plot based on computer simulation data correlating dynamic pressure and a distance of conduit from a marine seismic source according to an embodiment of the disclosure herein.

The graph illustrated in FIG. 3A shows operating parameters for a non-limiting embodiment of system 80 based on computer simulation data. FIG. 3A illustrates curve 350 which indicates a dynamic pressure in conduit 52 (y-axis) as a function of a length of conduit 52 (x-axis) when system 80 is operating at a resonance frequency of 3 Hz, at an instant in time in which the magnitude of the pressure is maximum. The dynamic pressure may vary sinusoidally with time. Curve 350 may be interpreted to show that a total length of conduit 52 starts at x=0 and ends at just over 14 meters. Lines 400 and 500 demarcate respective ends of conduit 52 (e.g., an end that is configured to couple to marine seismic source 82 indicated by line 400 and another end that is configured to couple to gas reservoir 88 indicated by line 500). In the particular configuration that corresponds to the graph illustrated in FIG. 3A, each end of conduit 52 may be coupled to marine seismic source 82 or gas reservoir 88 via a respective pipe segment such as a 6" pipe segment. Curve 350 may be interpreted to show that the dynamic pressure within system 80 passes through zero within the total length of conduit 52. The varying particular dynamic pressure may be interpreted to indicate that marine seismic source 82 is under pressure when gas reservoir 88 is under a partial vacuum. In other words, FIG. 3A indicates that the volume of resonating gas may "slosh" back and forth between marine seismic source 82 and gas reservoir 88.

Because a resonance of the volume of resonating gas within system 80 may be approximated as proportional to $$\sqrt{\frac{\text{cross-sectional area of conduit 52}}{\text{length of conduit 52}}},$$

given a particular change in a ratio of a cross-sectional area and/or a length of conduit 52, a corresponding change in the resonance of the volume of gas within conduit 52 may be approximated or determined.

When coupled via conduit 52, cavity 90 and gas reservoir 88 may be pressurized to reach a certain pressure. In some embodiments, cavity 90 may include a volume of gas at a pressure greater than a static pressure at the particular water depth. In other embodiments, however, cavity 90 may include a volume of gas at a pressure less than a static pressure at the particular water depth. In other embodiments, an amount of overpressure or underpressure within cavity 90 and/or gas reservoir 88, when compared to an ambient static or hydrostatic pressure, may be constrained regardless of the particular water depth, for example, up to +−0.3 bar. Certain embodiments of marine seismic source 82 that include piezoelectric components may be less tolerant of tension than of compression. For one of these embodiments, a pressure within cavity 90 and gas reservoir 88 may be near a hydrostatic ambient pressure so that the pressure is no more than about 0.2 bar less than the ambient pressure. A sound projector such as marine seismic source 82 may generate acoustic energy at a particular frequency range (e.g., a low frequency range between about 1 Hz and 10 Hz). Such a sound projector (e.g., marine seismic source 82) may achieve a particular ratio of power output to sound projector size at a particular mechanical resonance frequency. While a resonance frequency of the volume of gas may be approximated or determined and varied based on varying dimensions of conduit 52, as discussed in more detail above with regard to FIG. 3A, a mechanical resonance frequency of marine seismic source 82 may be specific to a stiffness and a mass (e.g., vibrating mass) of marine seismic source 82.

In general, when diameters of discs 84a and 84b increase and thicknesses of discs 84a and 84b decrease, the mechanical resonance frequency of marine seismic source 82 may decrease. This is largely due to a decrease of an overall stiffness of discs 84a and 84b, which may also be expressed as an increase in the mechanical compliance of discs 84a and 84b. (Generally speaking, those skilled in the art may also refer to increasing mechanical compliance as "softness," as opposed to "stiffness.") The more mechanically compliant marine seismic source 82 is, the lower its mechanical resonance frequency may be.

On the other hand, when diameters of discs 84a and 84b increase and the mechanical resonance frequency decreases, a stiffness of the volume of gas within cavity 90 may increase relative to the overall stiffness of discs 84 and 84b. An increase in stiffness of the volume of gas within cavity 90 may result in a decrease in the acoustic energy output of marine seismic source 82. In other words, when the stiffness of the volume of gas within cavity 90 increases, it may inhibit the vibration amplitude of discs 84a and 84b and may cause a decrease in the acoustic energy output of marine seismic source 82. Moreover, the stiffness of the volume of gas within cavity 90 may also increase as the internal pressure increases.

Unless a sound projector (e.g., marine seismic source 82) is pressure compensated (e.g., keeping internal pressure including the pressure of the volume of gas within cavity 90 at or near an ambient static or hydrostatic pressure), the sound projector having subsonic resonance frequencies may have survival depths of only a few meters below a water surface. Therefore, as the operating depth increases, the internal pressure within the sound projector (e.g., marine seismic source 82) may increase, with a concomitant increase in stiffness and loss of acoustic energy output.

A maximum sound pressure level of a sound projector (e.g., marine seismic source 82) generally occurs at or near a mechanical resonance of the sound projector. Broadly speaking, sound pressure is a difference, in a given medium, between an average local pressure and a pressure in an acoustic wave. A square of this difference may be averaged over time and/or space, and a square root of this average provides a root-mean-square (RMS) pressure value or $P_{rms}$. Sound pressure level is a logarithmic measure indicating a ratio of a given $P_{rms}$ relative to a reference sound pressure or $P_{ref}$. Sound pressure level is typically measured in decibels (dB). In marine applications, a reference pressure $P_{ref}$ is usually 1 micropascal (1 µPa). In mathematical terms, sound pressure level may be calculated by the equation below:

$$\text{Sound Pressure Level (dB)} = 20 \log(P_{rms}/P_{ref})$$

A transmitting voltage response or TVR of a sound projector (e.g., marine seismic source 82) may be defined as a sound pressure level generated at a range of 1 meter by the sound projector (e.g., marine seismic source 82) for a 1 volt drive of input electric energy. TVR may be measured in a unit of decibels (dB) relative to a reference pressure of 1 micropascal for a 1 volt drive at 1 meter range.

In the embodiment illustrated in FIG. 1, a sound pressure level and/or a TVR level of marine seismic source 82 may depend at least in part on a resonance frequency of a resonating gas flow within system 80. When system 80 operates based on the resonance frequency of the resonating gas flow and marine seismic source 82 vibrates, discs 84*a* and 84*b* may flex inwardly and outwardly along axis of symmetry 11 (upon receiving electric energy, for example). When discs 84*a* and 84*b* flex inwardly (e.g., toward one another along axis of symmetry 11), the volume of gas within cavity 90 may be exiting cavity 90 at such a speed that a partial vacuum may exist within cavity 90. When there is a partial vacuum (relative to an average or overall pressure within system 80) within cavity 90, the acoustic energy output and vibration amplitude (e.g., displacement) of discs 84 and 84*b* may increase. When marine seismic source 82 actuates or vibrates, discs 84*a* and 84*b* may also flex outwardly (e.g., away from one another along axis of symmetry 11) and the volume of gas entering into cavity 90 from gas reservoir 88 may cause the pressure within cavity 90 to increase above its ambient pressure (e.g., ambient static pressure, ambient hydrostatic pressure, etc.). The acoustic energy output of discs 84*a* and 84*b* may increase as a result.

When a resonant system is operating at the resonance of the resonating gas flow, the system, such as an embodiment of system 80, would operate so that the reactive forces of inertia and stiffness cancel, and the vibration amplitude may be dependent on resistive elements (e.g., frictions in the system).

Figure 3B:
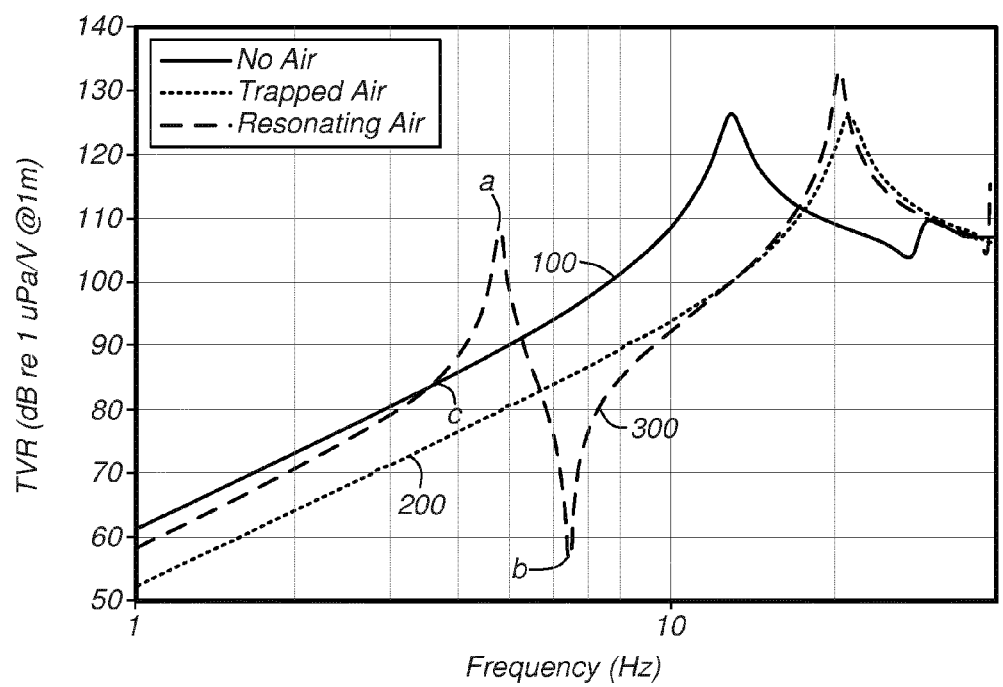
FIG. 3B illustrates a theoretical correlation between certain parameters for various configurations of a marine seismic source which includes a configuration according to an embodiment of the disclosure herein.

FIG. 3B may assist in understanding the operation of a resonant system. FIG. 3B illustrates theoretical operations of marine seismic source 82 under three configurations. The plot in FIG. 3B has an x-axis as a frequency at which marine seismic source 82 is operated and a y-axis as TVR for each configuration. A change in the TVR as a function of frequency for operating each configuration is accordingly shown as curve 100, curve 200, and curve 300 respectively.

Curve 300 illustrates the operation of marine seismic source 82 having a volume of gas (air in this case) within cavity 90 coupled to gas reservoir 88 by way of conduit 52, between which a resonating gas flow (a resonating air flow) may pass (e.g., as described above with respect to one embodiment of system 80). Based on an embodiment in which conduit 52 has a particular cross-sectional area and a particular length, the resonance of the resonating gas flow in this configuration may be at approximately 5 Hz.

FIG. 3B illustrates two other configurations of marine seismic source 82: a first in which cavity 90 is at a vacuum (e.g., illustrative of an operating state in which a volume of gas or air may have little or no effect on the TVR), and a second having a volume of gas (air in this case) that is trapped within cavity 90 (e.g., the volume of gas restricted within cavity 90 or not communicative with objects external to cavity 90).

Curve 100 corresponds to a configuration in which cavity 90 is at a vacuum (e.g., illustrative of an operating state in which a volume of gas or air may have little or no effect on the motion of discs 84*a* and 84*b*) or the "no-air" case. Curve 100 indicates, for example, a slope of the TVR is 12 dB/octave at frequencies well below resonance (e.g., 1 Hz) and increases as the frequency nears the mechanical resonance frequency of marine seismic source 82, which is indicated to peak at about 12 Hz in FIG. 3B. Marine seismic source 82 is generally stiffness controlled (e.g., the stiffness of the marine seismic source is a dominant factor during operation) up to its fundamental resonance whereas marine seismic source 82 is generally mass controlled (e.g., the mass of the marine seismic source is a dominant factor during operation) above the fundamental resonance. Thus near a particular frequency below the fundamental resonance, for example, at a frequency of 3 Hz, the vibratory amplitude of discs 84*a* and 84*b*, and hence the TVR, is controlled by the stiffness of marine seismic source 82 and of the volume of gas.

Curve 200 corresponds to a configuration in which a volume of gas (air) is trapped within cavity 90, or the "trapped air" case. Because the volume of gas is restricted within cavity 90 and cannot escape or communicate with objects external to cavity 90, the volume of gas may be compressed when discs 84*a* and 84*b* move axially inward. A concomitant increase in an internal pressure may therefore impede the motion of discs 84*a* and 84*b*. Such impedance may result in a decreased vibration amplitude of discs 84*a* and 84*b*, which may lead to a decreased acoustic radiation. In the "trapped air" case, a mechanical resonance frequency of marine seismic source 82 may be greater than that of the "no-air" case because the stiffness of discs 84*a* and 84*b* may be augmented by the stiffness of the trapped air. The fundamental resonance for this "trapped air" configuration is indicated at a peak of 20 Hz. Curve 200 indicates that the acoustic power output at 1 Hz is about 10 dB less than the acoustic power output indicated in curve 100, which is a factor of 10 in power (e.g., a change of 3 dB is a factor of 2 in power and 20 dB is a factor of 100). A loss in acoustic power output may increase when a volume of cavity 90 decreases. A loss in acoustic power output may also increase when an operating depth is increased. In other words, the stiffness of the volume of air within cavity 90 may be varied by varying either or both of these parameters.

Because marine seismic source 82 is generally stiffness controlled below its fundamental resonance (e.g., 12 or 20 Hz with respect to curves 100 or 200 indicated in FIG. 3B), its acoustic power output is strongly affected by the stiffness of the gas (e.g., air) within cavity 90. Just below the resonance of the volume of gas, the phase (measured against the drive voltage) of the partial vacuum created by the gas rushing out such that it enhances the vibration amplitude; whereas above the 5 Hz resonance, the phase of the partial vacuum is such that it impedes the vibration amplitude. Marine seismic source 82 remains generally stiffness controlled in these scenarios that correspond to curves 100 and 200. Because marine seismic source 82 is generally stiffness controlled below its fundamental resonance, the pressure of gas within cavity 90 may have such a dramatic impact on performance. Due to the phase of the gas flow velocity changing through the resonance of the gas, the dynamic gas pressure at first assists, and then detracts, from the vibration amplitude of discs 84*a* and 84*b*.

As noted earlier, FIG. 3B indicates that the resonance of the volume of gas (air in this case) is approximately at 5 Hz. Just below 5 Hz, the dynamic pressure of the gas enhances the vibration amplitude of discs 84*a* and 84*b*. At 6.5 Hz, however, the dynamic pressure of the gas has its maximum detrimental effect on the vibration amplitude.

Curve 300 corresponds to a configuration of marine seismic source 82 in which a resonating gas flow (air, in this case) may pass between cavity 90 and gas reservoir 88 (that is, marine seismic source 82 in fluid communication with reservoir 88). When operating at a frequency below the resonance frequency of the resonating gas, the volume of gas may move in phase with discs 84a and 84b (e.g., near 0 degree phase), and whether the volume of gas is contained within cavity 90 or within gas reservoir 88 may therefore have little or no effect on the movements of the discs. When operating below resonance, an inward movement of discs 84a and 84b may not create a pressure as high as that that indicated by curve 200. A decrease in TVR at low frequencies (e.g., 1 Hz) may therefore be less as indicated by curve 300.

On the other hand, when the frequency increases in curve 300 and approaches the resonance of the resonating gas flow, the volume of gas may be energized by the movements of discs 84a and 84b. The closer the frequency is to the resonance of the resonating gas, the larger the volume of gas may be exiting cavity 90. When the system is operated at resonance, an amplitude of a movement of the volume of gas may be greatest. The gas movement is at a 90-degree phase relative to discs 84a and 84b.

In FIG. 3B, at the point where curve 300 intersects curve 100 as indicated by "c," the volume of gas may be exiting cavity 90 at a rate sufficient to keep the dynamic pressure at zero (e.g., the gas or air has no effect on the TVR). At a greater frequency immediately above the frequency at intersecting point "c," the volume of gas may be exiting cavity 90 at a rate to create a partial vacuum pressure that enhances the movements of discs 84a and 84b.

Relative to curves 100 and 200, curve 300 thus shows a lower frequency local maximum indicated by "a." The lower frequency local maximum may indicate operating states in which movements of discs 84a and 84b may be facilitated by the resonating gas flow. Curve 300 additionally suggests that, when operating above the resonance frequency of the volume of gas, the dynamic pressure imparted by the volume of gas may impede the motion of discs 84a and 84b. When discs 84a and 84b are flexing inwardly, the gas flow may enter cavity 90 from gas reservoir 88, thereby opposing the motion of discs 84a and 84b. This condition in which the gas flow most opposes the motion of discs 84a and 84b above the resonance frequency may be observed by the trough indicated as "b" in curve 300.

A resonance of marine seismic source 82 or the volume of gas (e.g., air) may create a 180 degree phase shift in whatever is resonating. When phase relative to the drive voltage to system 80 is measured, it is the phase of the volume of gas that determines whether the pressure of the volume of gas may enhance or detract from the TVR. Accordingly, when system 80 is operating at a frequency above the resonance frequency, movements of the volume of gas may be 180 degrees out of phase with the movement of discs 84a and 84b. FIG. 3B illustrates that the motion of discs 84a and 84b at a frequency near a peak of the TVR may be more than 40 dB greater than at a trough of the TVR.

FIG. 3B additionally indicates that curve 300 may at least partially overlap with curve 200 when operating above resonance. This happens in curve 300 because the volume of gas (air in this case) is generally mass controlled while marine seismic source 82 remains generally stiffness controlled. As these frequencies (and during a half cycle), an impedance imparted by conduit 52 may be so high that little or air may move within conduit 52, which is similar to the "trapped air" configuration indicated by curve 200.

Returning to the embodiment illustrated in FIG. 1, a sound pressure level and/or a TVR level of marine seismic source 82 may depend at least in part on a resonance frequency of a resonating gas flow within system 80. When marine seismic source 82 operates (e.g., is driven) at a particular frequency, marine seismic source 82 may actuate at a driving frequency. When the resonance frequency of the resonating gas flow within system 80 is near or equal to the operating frequency, marine seismic source 82 may be operable to produce a particular sound pressure level and/or TVR level for a particular water depth.

An advantageous operating depth may be determined based on a frequency of operating system 80. The operating depth may be calculated by $\lambda/4$ where $\lambda$ is a wavelength of the acoustic wave output. In one embodiment in which system 80 is operating at a frequency of 5 Hz, the wavelength may be approximately 300 meters (e.g., based on a sound velocity in water of approximately 1,500 m/s) and the advantageous operating depth may therefore be approximately 75 meters. When system 80 is operated at a particular water depth of 75 meters or deeper below water surface, the volume of gas within system 80 may be pressurized to a pressure at or near an ambient hydrostatic pressure of the water at that particular depth or correspondingly higher.

Referring back to FIG. 3A, which may be interpreted to show that a resonance frequency of the volume of resonating gas within system 80 may be proportional to $$\sqrt{\frac{\text{cross-sectional area of conduit 52}}{\text{length of conduit 52}}},$$

a resonance frequency of the gas within system 80 may be adjustable or tunable based on adjusting or varying dimensions (e.g., a cross-sectional area, a length, etc.) of conduit 52. Conduit 52 may include at least one dimension that is adjustable to change, adjust or tune a resonance frequency of system 80. In the particular configuration of system 80 that corresponds to the graph illustrated in FIG. 3A, the portion of the system between line 400 and line 500 generally includes the portion of conduit 52 that may be adjusted for a change in the resonance. In one embodiment, the dimension that is adjustable may include a length of conduit 52. In other embodiments, the dimension that is adjustable or tunable may include a width, a diameter, a cross-sectional area or other dimensions of conduit 52, or combinations of any of these dimensions.

Figure 3C:
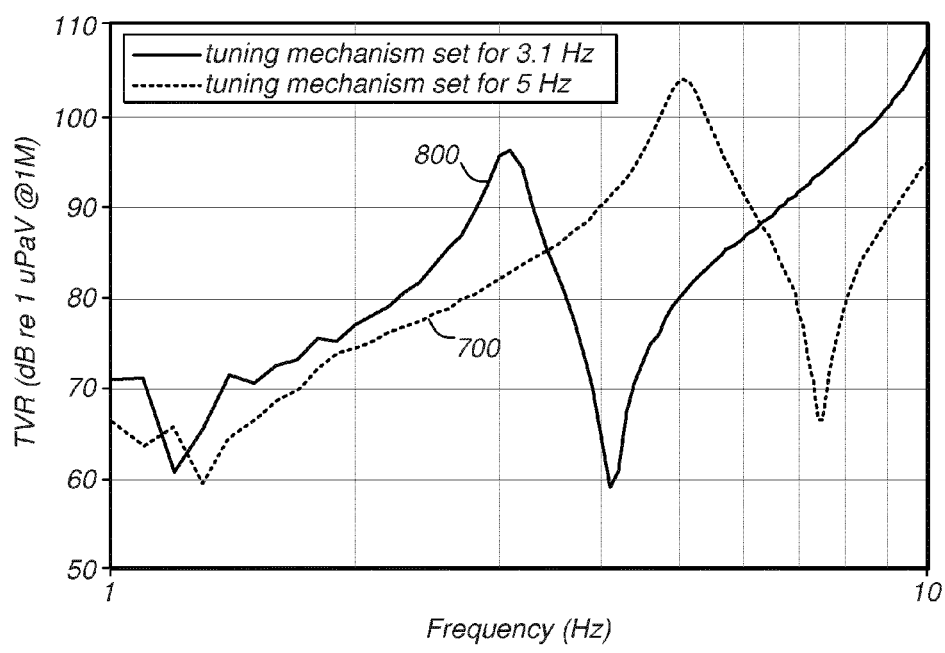
FIG. 3C illustrates a plot for empirical data correlating certain parameters for an operation of an embodiment of the disclosure herein.

FIG. 3C illustrates empirical operating data for an embodiment of marine seismic source 82 at two resonance frequencies of the gas (air in this case), 3.1 Hz and 5 Hz. In FIG. 3C, the x-axis corresponds to a frequency at which marine seismic source 82 is operated and the y-axis corresponds to TVR. FIG. 3C illustrates that the air resonance for curve 800 is at about 3.1 Hz; the air resonance for curve 700 is at about 5 Hz which corresponds to FIG. 3B. A change in the TVR as a function of operating frequency for each resonance is accordingly shown as curve 800 and curve 700 respectively. FIG. 3C indicates that when the particular dimensions of conduit 52 are adjusted, the resonance frequency of the resonating gas flow within system 80 may be adjusted as a result. Adjusting or "tuning" the resonance frequency of the resonating gas flow within system 80 may therefore be achievable based on adjustments to the particular dimensions of conduit 52.

Figure 3D:
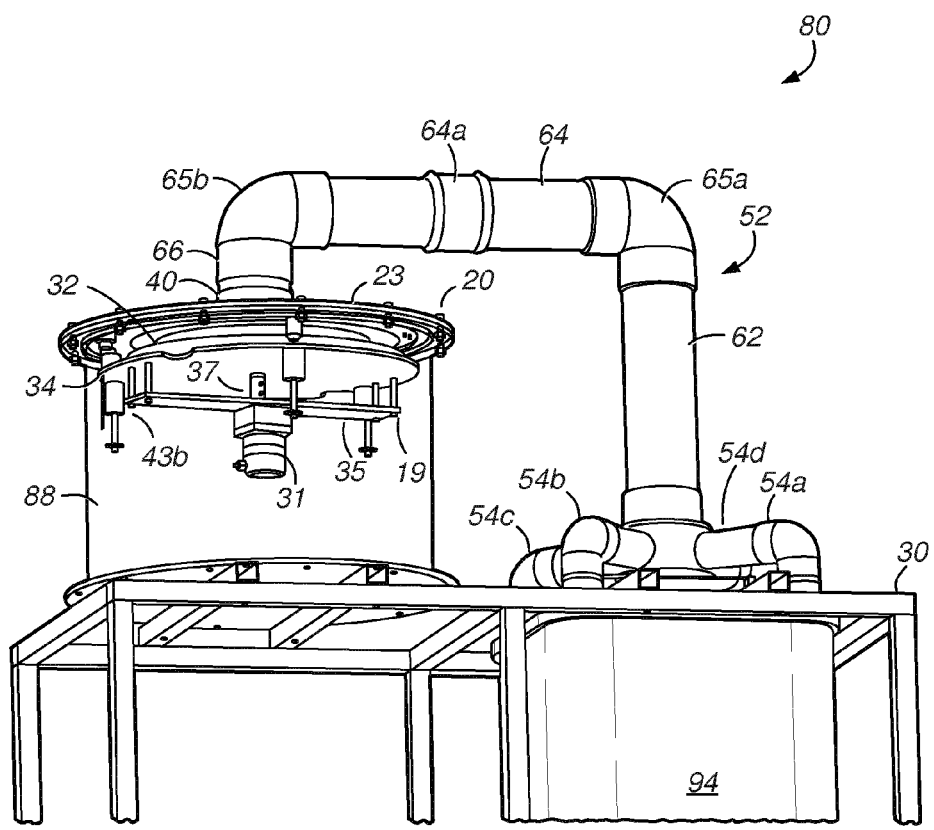
FIG. 3D illustrates an embodiment of a system according to the disclosure herein.

FIG. 3D illustrates the arrangement of certain elements of FIG. 1 in greater detail, according to a particular embodiment. FIG. 3D illustrates apparatus 94 which may include at least one marine seismic source 82 (not in view) enclosed within boot assembly 98 (illustrated in FIG. 6A). Boot assembly 98 may be a protective housing over marine seismic source 82. Further details with regard to apparatus 94 and boot assembly 98 are provided in FIG. 6A and/or FIG. 6B, discussed below.

Marine seismic source 82 (inside of apparatus 94) may be connected to gas reservoir 88 via conduit 52. Gas reservoir 88 may be disposed external to at least one marine seismic source 82. Support structure 30 may be a support structure for apparatus 94, gas reservoir 88 and conduit 52. In this embodiment, apparatus 94 may be disposed below a surface of support structure 30, whereas gas reservoir 88 may be disposed above the surface of support structure 30.

In this particular non-limiting embodiment, conduit 52 may include three pipe segments 62, 64, and 66, each with a diameter of about six inches. In other embodiments, pipe segments 62, 64, and 66 may each have a larger or smaller diameter. In the embodiment shown, pipe segment 64 may include a pipe connector 64a connecting two portions of pipe segment 64. Conduit 52 may additionally include elbows 65a and 65b. In this particular embodiment, pipe segment 62 may be disposed in a vertical orientation above apparatus 94, and elbow 65a may connect pipe segment 62 with pipe segment 64 which may be disposed in a horizontal orientation. Elbow 65b may connect pipe segment 64 with pipe segment 66 which may be disposed in a vertical orientation. Pipe segment 66 may be connected to gas reservoir 88 via aperture 40.

In this embodiment, conduit 52 may include manifold conduits 54a, 54b, 54c, and 54d. Each of manifold conduits 54a, 54b, 54c, and 54d may be connected to each of manifolds 96a, 96b, 96c, and 96d (details provided in associated with FIG. 6B) of apparatus 94, respectively.

Conduit 52 may include a motor 31 operable to move a portion of conduit 52. Motor 31 may be an electric motor or another type of motor. At least one dimension of conduit 52 may be adjustable in response to the movement caused by motor 31. More specifically, conduit 52 may include first portion 32 and second portion 34. In the embodiment illustrated, second portion 34 (partially shown) may be disposed within gas reservoir 88. First portion 32 (partially shown) may be coupled to and disposed above second portion 34. Motor support 35 and one or more standoffs 19 may be used to position motor 31 to second portion 34. Threaded motor shaft 37 may be attached to motor 31 and pass freely through second portion 34 (additional discussion provided below with regard to FIGS. 4A-4C). Second portion 34 may be coupled to motor 31 by way of at least one motor support 35. First portion 32 may also be coupled to second portion 34 by way of at least one bearing rod 43a (not in view) that corresponds to (e.g., fits inside of) bearing block 43b included in second portion 34 (illustrated in FIGS. 4B and 4C). Cover or lid 23 may be secured around a perimeter of gas reservoir 88 by at least one bolt 20 (bolt 20 may be used to secure a variety of objects including cover or lid 23, hoop 33, discs 84a or 84b). First portion 32 may be secured to cover or lid 23 (through perforation 17 illustrated in FIG. 4A). When motor 31 operates to move (e.g., up or down from near a top of gas reservoir 88 toward a bottom of reservoir 88) second portion 34 relative to first portion 32, at least one dimension of conduit 52 may be adjustable in response to the movement. In one particular embodiment, the at least one dimension of conduit 52 may be a length of conduit 52. In an alternative embodiment, the at least one dimension may be a cross-sectional area of conduit 52. A resonating gas flow may enter/exit gas reservoir 88 through first portion 32 and second portion 34. In the embodiment illustrated, the resonating gas flow may enter aperture 40 and pass through the two portions of conduit 52.

Figure 4A:
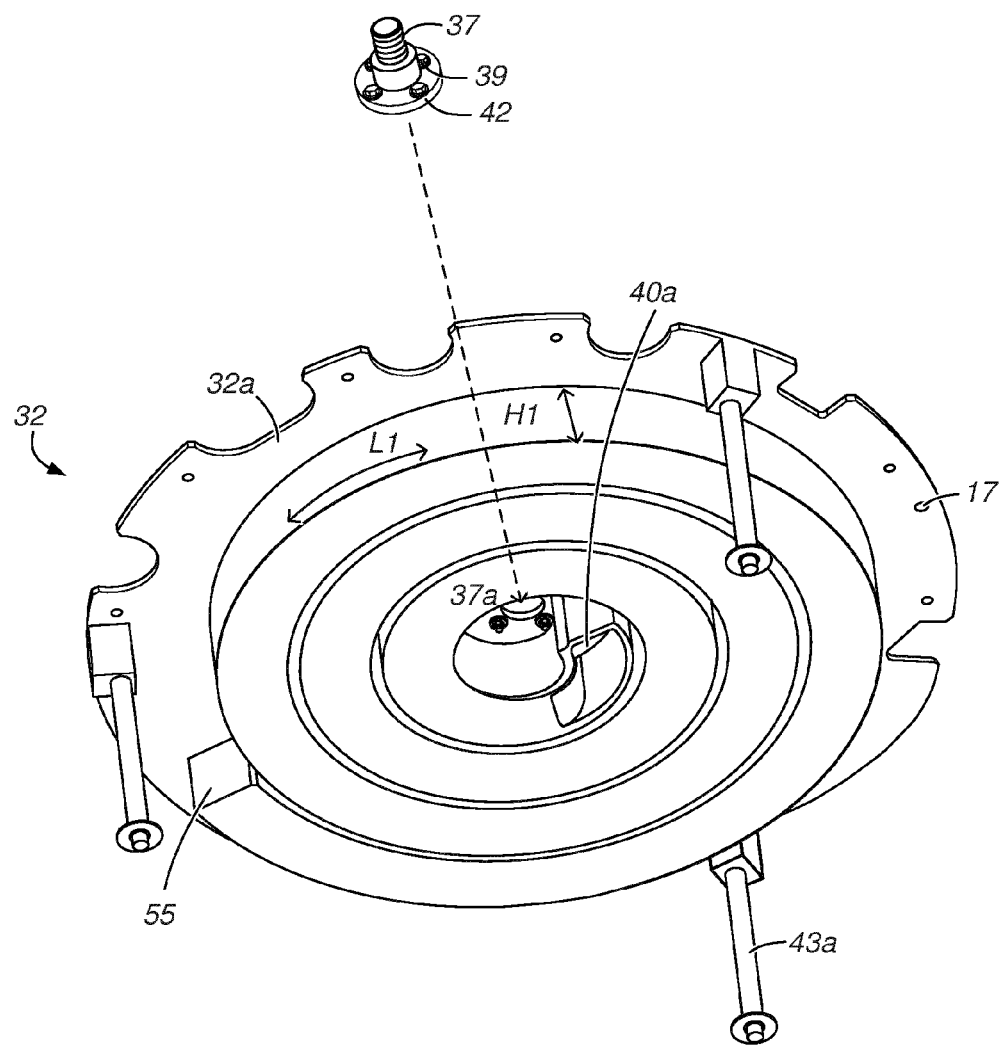
FIG. 4A illustrates a portion of a conduit according to an embodiment of the disclosure herein.

FIG. 4A illustrates an embodiment of first portion 32. First portion 32 may include aperture 40a configured to facilitate a resonating gas flow enter and/or pass through first portion 32. The resonating gas may enter first portion 32 from aperture 40 (illustrated in FIG. 3D). In some embodiments, aperture 40 may incorporate aperture 40a as one structure. In other embodiments, however, aperture 40 and aperture 40a may be two distinct structures.

First portion 32 may include first plate 32a. First plate 32a may be metal or other material. First plate 32a may include a generally round shape with an uneven perimeter although other shapes have been contemplated and expressly included. First plate 32a may include at least one perforation 17. At least one perforation 17 may be configured to facilitate securing first portion 32 (e.g., using at least one bolt 20) to cover or lid 23 illustrated in FIG. 3D. First plate 32a may include threaded nut 39 which may be coupled to second portion 34 via threaded motor shaft 37. Threaded nut 39 may be secured to first plate 32a via collar 42. In the non-limiting embodiment illustrated, threaded nut 39 may receive and secure threaded motor shaft 37 on a side opposite of component 55 via collar 42 at opening 37a. First portion 32 may also include at least one bearing rod 43a which may be connected to (e.g., fit into) bearing block 43b included in second portion 34 (illustrated in FIGS. 4B and 4C). A connection formed based on bearing rod 43a and bearing block 43b may help stabilize and/or maintain orientation of first portion 32 and/or second portion 34 during operation.

First plate 32a may include component 55. A bottom side of component 55 may be attached to one side of first plate 32a. In a non-limiting embodiment, first plate 32a and component 55 may be machined from one piece of material. Component 55 may render first portion 32 a male portion of conduit 52. That is, component 55 may render first portion 32 a first half of a pair of connectors or fasteners such that the first half may connect to and/or fit into the second half.

A height of component 55 indicated as "H1" in FIG. 4A may indicate a distance from the bottom portion of component 55 (e.g., the portion that is directly connected first plate 32a) to a top portion of component 55 (e.g., the portion that is no directly connected to first plate 32a). A length of component 55 may be indicated by L1.

Component 55 may be continuous and may run from an outer perimeter of first plate 32a to a center of first plate 32a. Component 55 may have a particular length L1 dependent on, for example, a diameter of first plate 32a, or a shape or configuration of component 55. In the non-limiting embodiment illustrated in FIG. 4A, component 55 may be disposed on first plate 32a in a spiral shape. In this embodiment, L1 may be dependent on the number of coils of the spiral shape. In other embodiments, however, other shapes and/or configurations of component 55 are contemplated and included.

Figure 4B:
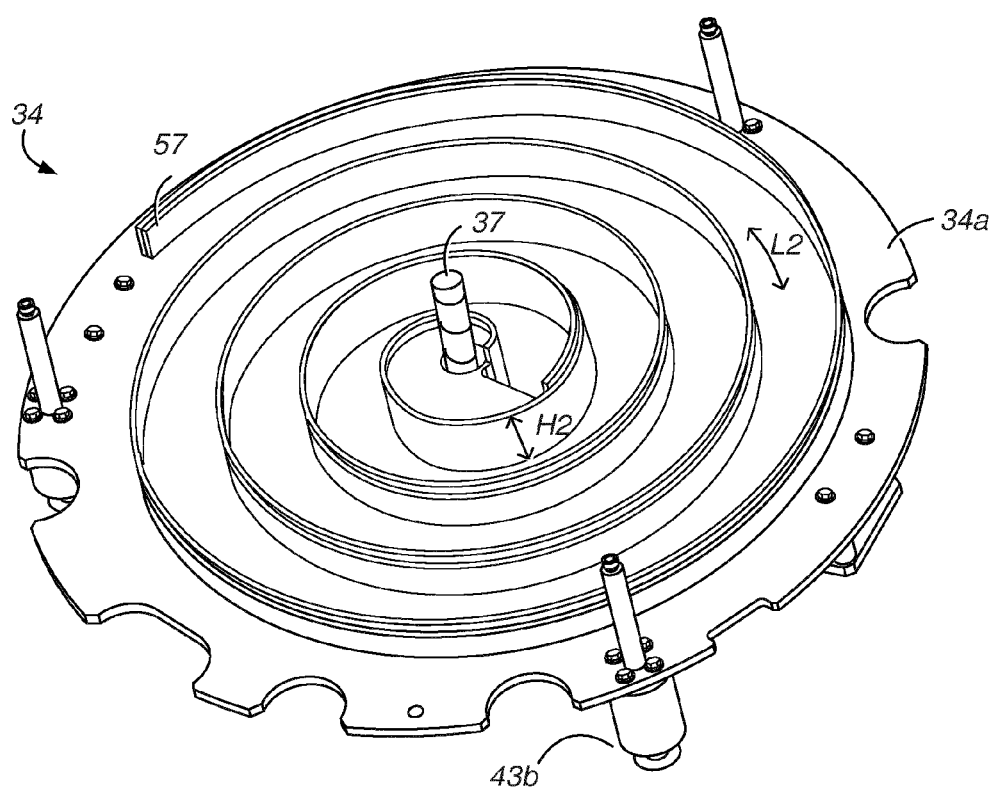
FIG. 4B illustrates one side of another portion of a conduit according to an embodiment of the disclosure herein.
Figure 4C:
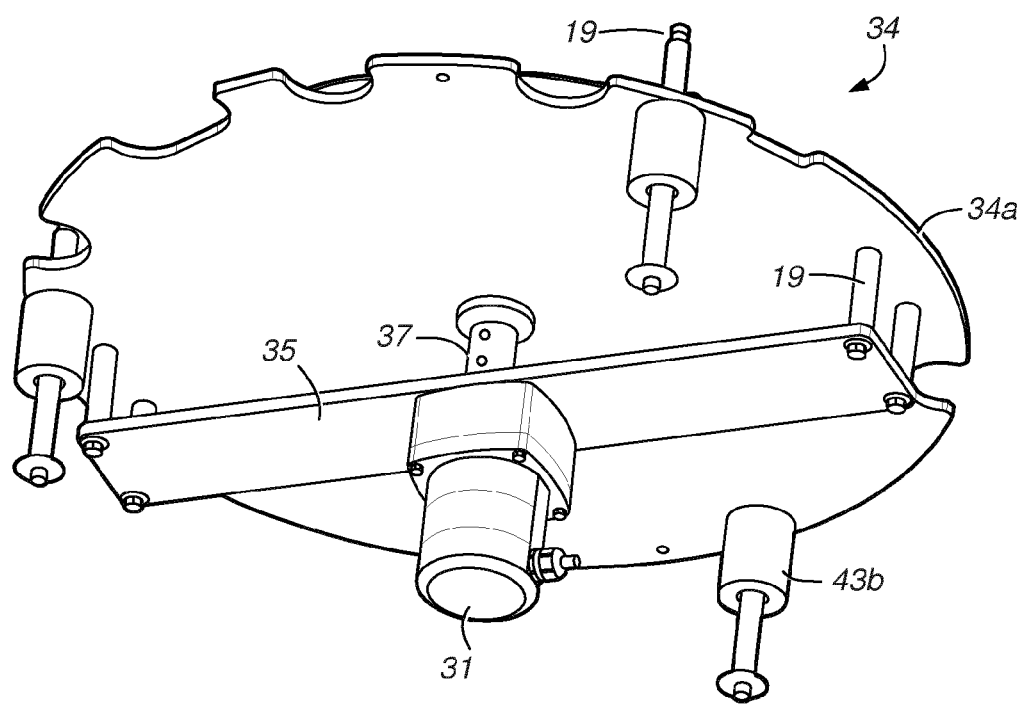
FIG. 4C illustrations another side of the portion illustrated in FIG. 4B.

FIG. 4B and FIG. 4C respectively illustrate each side of second portion 34. Second portion 34 may include second plate 34a. Second plate 34a may be metal or other material. Second plate 34a may be of a shape in correspondence with that of first plate 32a. For example, second plate 34a may be of a generally round shape with an uneven perimeter in correspondence with first plate 32a. Other shapes, however, have been contemplated and expressly included. Threaded motor shaft 37 may be attached to motor 31 and may move freely within second portion 34.

Second portion 34 may include component 57 illustrated in FIG. 4B. A bottom portion of component 57 may be attached to one side of second plate 34a. In a non-limiting embodiment, second plate 34a and component 57 may be machined from one piece of material. Component 57 may render second portion 34 a female portion of conduit 52. That is, relative to a first half of a pair of connectors or fasteners, component 57 may render second portion 34 a second half of the pair for the second half to connect and/or receive the first half.

FIG. 4C illustrates a side of second plate 34*a* opposite to component 57. In this embodiment illustrated, motor support 35 and one or more standoffs 19 may be used to position motor 31 to second portion 34. Threaded motor shaft 37 may receive threaded nut 39 illustrated in FIG. 4A. Second portion 34 may be coupled to motor 30 via motor support 35 and threaded motor shaft 37. Threaded motor shaft 37 may couple motor 31 to a point (e.g., a center portion) of second portion 34 and first portion 32. Motor support 35 may facilitate a movement of second portion 34 based on the operation of motor 31. In an example, threaded motor shaft 37 may turn freely within second portion 34, and threaded nut 39 connected to threaded motor shaft 37 may cause second portion 34 to raise and lower as threaded motor shaft 37 rotates while first portion 32 generally remains stationary. Other mechanisms under which first portion 32 and second portion 34 may be moved relative to one another are contemplated and expressly included in this disclosure. Second portion 34 may also include at least one bearing block 43*b* that corresponds to bearing rod 43*a* illustrated in FIG. 4A.

A height of component 57 indicated as "H2" in FIG. 4B may indicate a distance from the bottom portion of component 57 (e.g., the portion that is directly connected second plate 34*a*) to a top portion of component 57 (e.g., the portion that is not directly connected second plate 34*a*). Component 57 may be continuous and may run from an outer perimeter of second plate 34*a* to a center of second plate 34*a*. Component 57 may have a particular length L2 dependent on, for example, a diameter of second plate 34*a* and a shape or configuration of component 57. In the non-limiting embodiment illustrated in FIG. 4B, component 57 may be disposed on second plate 34*a* in a spiral shape. In other embodiments, however, other shapes and/or configurations of component 57 are contemplated and included. A height, length, shape or configuration of component 57 may correspond to that of component 55. An engagement between component 55 and component 57 may facilitate a resonating gas to pass through a channel 27 formed by the mating of first portion 32 and second portion 34.

In the embodiments illustrated in FIGS. 4A and 4B, height H2 of channel component 57 may vary from a center of second plate 34*a* to a perimeter of second plate 34*a*. For example, H2 may decrease from the center of second plate 34*a* to the perimeter of second plate 34*a*. Alternatively, H2 may increase or remain constant from the center of second plate 34*a* to the perimeter of second plate 34*a*. Height H1 of component 55 may vary and remain constant in correspondence with a configuration of H2.

Each of first portion 32 and second portion 34 may include at least one bearing rod 43*a* and bearing block 43*b*, respectively. Bearing rod 43*a* and bearing block 43*b* may each be configured to facilitate an engagement of the two portions. When second portion 34 is engaged with first portion 32 at a particular configuration, bearing rod 43*a* and/or bearing block 43*b* may facilitate to engage, separate, and/or align component 55 and component 57. When first portion 32 and second portion 34 is engaged (e.g., orthogonal to one another) at a particular configuration, a corresponding engagement of component 55 and component 57 may result in channel 27. At least one dimension of channel 27 may therefore be dependent on the particular engagement/separation of first portion 32 and second portion 34 and dimensions of component 55 and component 57. When component 55 and component 57 are in spiral shapes, channel 27 may correspondingly be formed in a spiral shape between first plate 32*a* and second plate 34*a*. For example, channel 27 may be formed as a result of at least one gap from an engagement/separation between the male and female portions of conduit 52 (e.g., corresponding to component 55 and component 57). Channel 27 may accordingly be a "maze"-like structure that is facilitated by the engagement/separation of component 55 and component 57. While lengths L1 and L2 and heights H1 and H2 are constants, they may facilitate the adjustment of at least one dimension of channel 27.

In another embodiment, channel 27 may be formed as a result of a separation based on an engagement/separation between a convex portion and a concave portion of conduit 52 (e.g., corresponding to component 55 and component 57). In that embodiment, the convex and concave portions may be engaged to form channel 27 between first plate 32*a* and second plate 34*a*.

Channel 27 may be configured to couple marine seismic source 82 to gas reservoir 88 external to marine seismic source 82. That is, one end of channel 27 may be configured to couple to marine seismic source 82 (e.g., by way of one end of conduit 52), while the other end of channel 27 may be configured to couple to gas reservoir 88 (e.g., by way of the other end of conduit 52). When channel 27 couples marine seismic source 82 to gas reservoir 88, channel 27 may be operable to allow passage of a gas to flow therethrough.

First portion 32 and second portion 34 may be movably coupled or engaged via motor 31, threaded motor shaft 37 and other components described above with regard to FIGS. 4A, 4B and 4C. For example, second portion 34 may be movably coupled to first portion 32 facilitated by at least one bearing rod 43*a* and/or at least one bearing block 43*b*. In one particular embodiment, first portion 32 and second portion 34 may each include moving seals (not separately shown) to facilitate the coupling and/or engagements between the two portions. In other embodiments, however, moving seals may be omitted for either or both portions.

When second portion 34 is movably coupled to first portion 32 or vice versa, motor 31 may be operable to cause movements of second portion 34 relative to first portion 32 or vice versa. In response to the movements of second portion 34 relative to first portion 32 (or movements of first portion 32 relative to second portion 34), at least one dimension (e.g., a length) of conduit 52 may be adjustable. For example, motor 31 may, by causing second portion 34 to move up or down, cause an adjustment of a configuration (e.g., an engagement and/or separation) between first portion 32 and second portion 34. Adjustments of the configuration between first portion 32 and second portion 34 may change the dimension(s) of channel 27.

In a non-limiting embodiment, second plate 34*a* may be movably coupled to first plate 32*a*. Motor 31 may be operable to cause movements between first plate 32*a* and second plate 34*a*, and the movements between first and second plates 32*a* and 34*a* may be operable to change the dimension(s) of channel 27. That is, the movements between first and second plates 32*a* and 34*a* may be operable to change a configuration (e.g., engagement/separation) between the plates. When the particular engagement/separation changes, the dimension(s) of channel 27 may change as a result.

Because a particular engagement/separation between first portion 32 and second portion 34 may result in a particular distance through which a resonating gas may travel in channel 27, the distance may be an effective length of channel 27. When marine seismic source 82 and gas reservoir 88 is coupled by way of conduit 52, the resonating gas may pass to/from marine seismic source 82 and gas reservoir 88 over a total distance that includes the effective length of channel 27.

When motor 31 is operable to cause continuous movements between first plate 32a and second plate 34a, the continuous movements may be operable to change the dimension(s) of channel 27 in a continuous manner.

A control system may receive information indicative of at least one dimension (e.g., a length) of channel 27. A linear variable differential transformer, or other means, may be used to provide such information. Based on the information, the control system may transmit operating instructions to motor 31. For example, the control system may instruct motor 31 to cause a movement second plate 34a relative to first plate 32a (or vice versa) to change the particular engagement/separation between first portion 32 and second portion 34. As a result of the change in the engagement/separation, a length of channel 27 may change from one length to a different length, or the cross-sectional area of channel 27, A1 in FIG. 5A, may change from one cross-sectional area to another cross-sectional area.

Figure 5A:
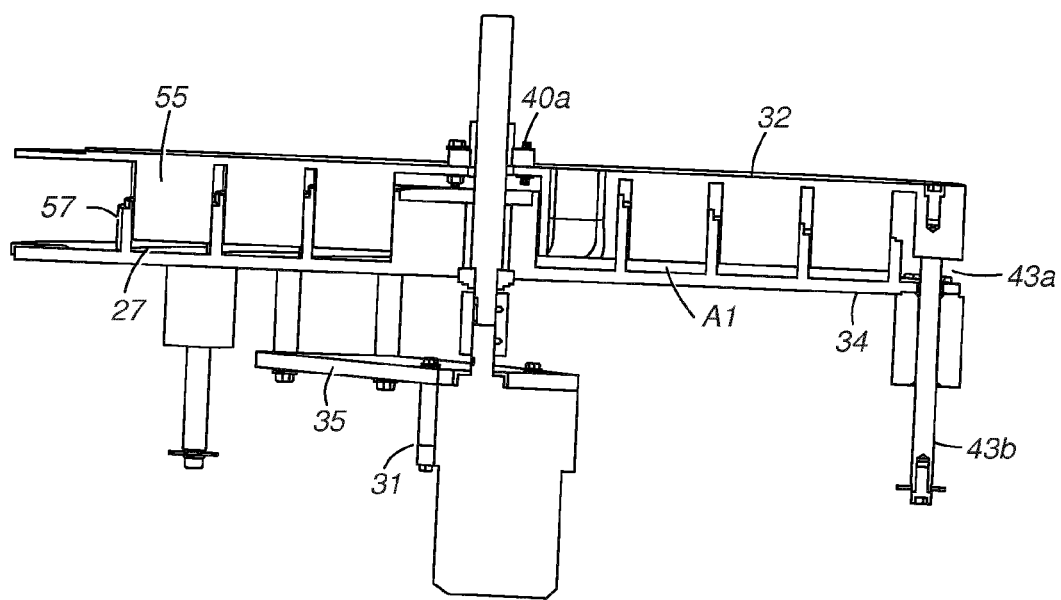
FIG. 5A illustrates a cross-sectional view of a conduit according to an embodiment of the disclosure herein.

FIG. 5A illustrates a cross-sectional view of an embodiment in which second portion 34 is fully or nearly fully engaged with first portion 32. As illustrated, component 55 and component 57 may be engaged to form channel 27. A resonating gas flow may enter one end of channel 27 through aperture 40a. Upon entering, the resonating gals flow may then move through channel 27 between first portion 32 and second portion 34 until it exits at another end of channel 27. In this particular configuration in which first portion 32 and second portion 34 are fully or nearly fully engaged, a length of channel 27 is approximately a full length of all coils in the spiral. In this configuration, because components 55 and 57 are fully or nearly fully engaged, there may be little separation between the components rendering channel 27 a narrow path. Channel 27 may therefore have a smaller cross-sectional area and greater length compared to other configurations when components 55 and 57 are further separated. Under this configuration, the resonating gas may pass to/from marine seismic source 82 and gas reservoir 88 through channel 27 having a particular cross-sectional area indicated by "A1" and a particular length that is approximately a full length that includes all coils that correspond to L1 and/or L2 illustrated in FIGS. 4A and 4B. In addition to being dependent on the engagement/separation between first portion 32 and second portion 34, the particular length of channel 27 may depend on L1 and L2 illustrated in FIGS. 4A and 4B. Based on cross-sectional area A1, and the particular length of channel 27, this configuration may result in a particular resonance frequency of the resonating gas.

At least one dimension of channel 27 illustrated in FIG. 5A may be adjusted based on the movements between first plate 32a and second plate 34a. For example, the at least one dimension may include a cross-sectional area and a length. Movements between first plate 32a and second plate 34a may accordingly adjust either or both of these dimensions.

Figure 5B:
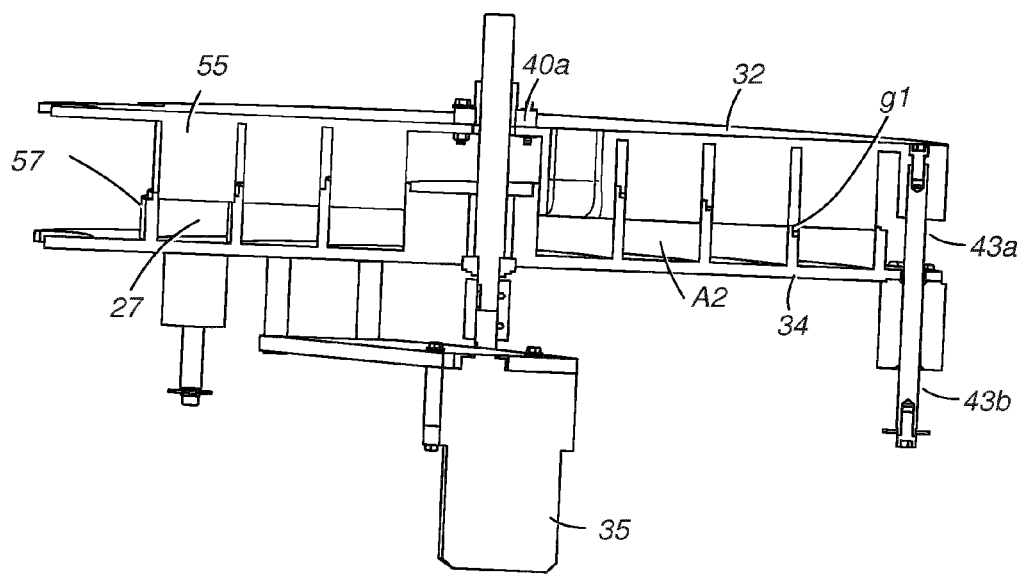
FIG. 5B illustrates a cross-sectional view of a conduit according to another embodiment of the disclosure herein.

FIG. 5B illustrates an embodiment in which the cross-sectional area of channel 27 has been changed to a width indicated as A2. To effect the change in the configuration of engagement from the embodiment illustrated in FIG. 5A to the embodiment illustrated in FIG. 5B, motor 31 may cause movements between first plate 32a and second plate 34a. Because the movements between first plate 32a and second plate 34a may be operable to change at least one dimension of channel 27, a cross-sectional area of channel 27 may be changed from "A1" indicated in FIG. 5A to "A2" in FIG. 5B. In the illustration in FIG. 5B, second portion 34 is now partially engaged with first portion 32. Based on the particular engagement/separation, a length of channel 27 may remain the same as that of the configuration illustrated in FIG. 5A. Unlike the configuration illustrated in FIG. 5A, however, a resonating gas flow may travel less than the entire or full length of channel 27 corresponding to L1 and/or L2. Instead, the resonating gas flow may exit through at least one gap "g1" illustrated in FIG. 5B. As a result of adjusting the cross-sectional area, this illustrated configuration may result in a different resonance frequency of the resonating gas than that of FIG. 5A.

Figure 5C:
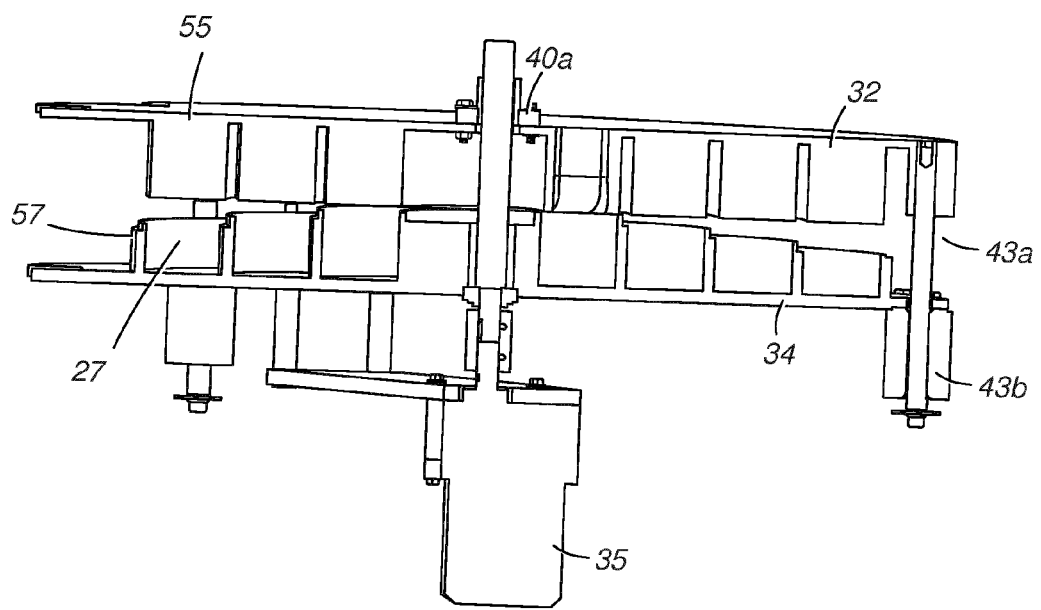
FIG. 5C illustrates a cross-sectional view of a conduit according to yet another embodiment of the disclosure herein.

FIG. 5C illustrates an embodiment in which second portion 34 is fully or nearly fully disengaged from first portion 32. In this configuration, when motor 31 operates causing movements between first and second plates 32a and 34a, two dimensions of channel 27 may be changed as a result. As a result of first portion 32 and second portion 34 being fully or nearly fully disengaged, channel 27 may have a minimal length compared to the configurations illustrated in FIG. 5A and FIG. 5B. The disengagement of the two portions may also result in a cross-sectional area of channel 27 being changed to allow a resonating gas to escape through the disengaged portions starting from the outer perimeter. This configuration may result in yet another different resonance frequency of the resonating gas than those of FIG. 5A and FIG. 5B.

Figure 6A:
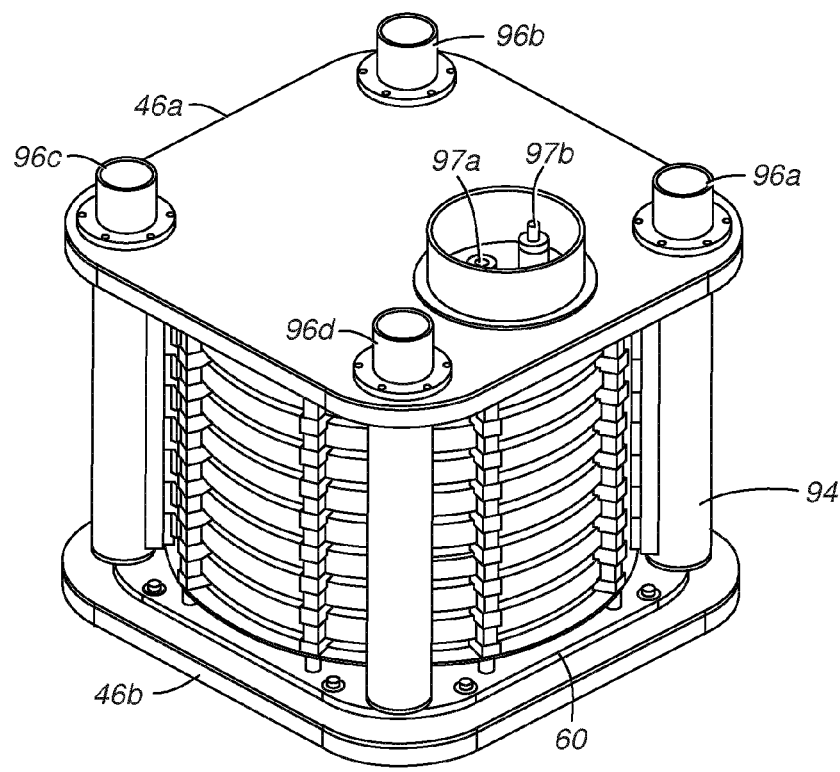
FIG. 6A illustrates a partial assembly of an embodiment of an apparatus according to the disclosure herein.

FIG. 6A illustrates another partial assembly of an embodiment of stack assembly 94 in which stack assembly 94 may include endplates 46a and 46b. Endplates 46a and 46b may enclose marine seismic source 82a, 82b, 82c, 82d, 82e, 82e, 82f, 82g, and 82h with top plate 70 (not in view) and bottom plate 60. Stack assembly 94 may also include electric connections 97a and 97b which may facilitate electric energy input to piezoelectric components 86a and 86b and/or discs 84a and 84b within stack assembly 94.

Figure 6B:
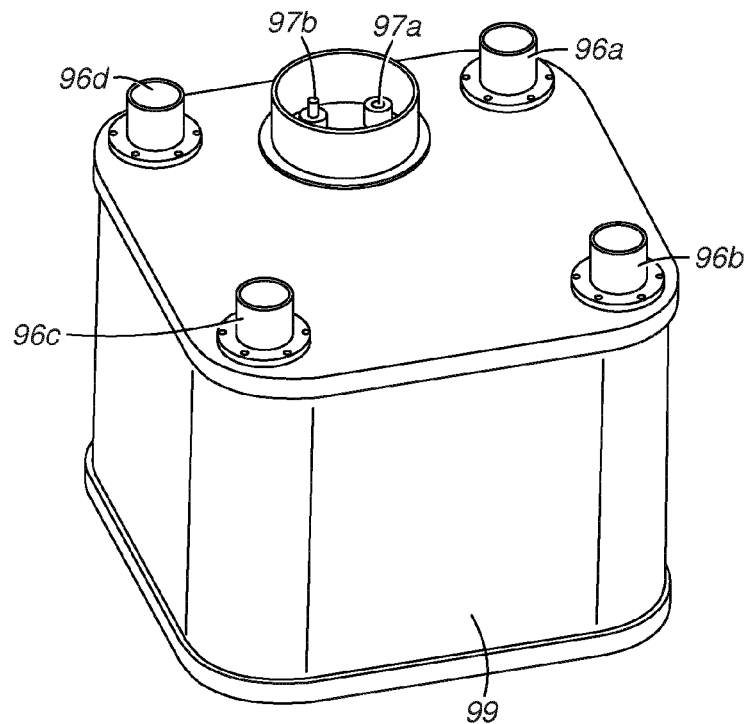
FIG. 6B illustrates an alternative partial assembly of an embodiment of an apparatus according to the disclosure herein.

FIG. 6B illustrates an embodiment of stack assembly 94 in which stack assembly 94 additionally includes boot assembly 99. Boot assembly 99 may enclose and/or be disposed around marine seismic sources 82a-82h and manifolds 96a, 96b, 96c and 96d. In one particular embodiment, boot assembly 99 may include (for example, contain) an electrically insulating material such as a fluid (e.g., electrically insulating oil) in which marine seismic sources 82a-82h may be immersed or at least partially disposed (not in view). The electrically insulating material may serve as an additional protective layer for marine seismic sources 82a-82h during certain operating conditions.

Figure 7:
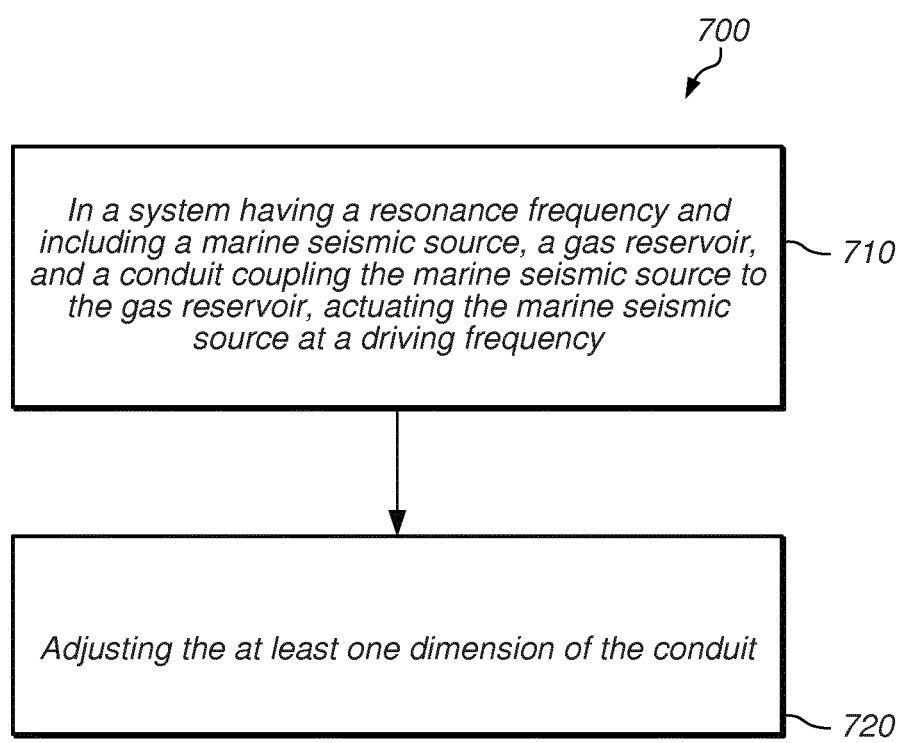
FIG. 7 illustrates a method of operating a system according to an embodiment of the disclosure herein.

FIG. 7 is a flow diagram illustrating an embodiment of a method of operating system 80. System 80 may include a marine seismic source (e.g., marine seismic source 82), a gas reservoir (e.g., gas reservoir 88), and a conduit (e.g., conduit 52) coupling the marine seismic source to the gas reservoir. When the conduit couples the marine seismic source to the gas reservoir, a resonating gas flow may pass between the marine seismic source and the gas reservoir through the conduit. System 80 may have a particular resonance frequency. The particular resonance frequency may be specific to, for example, at least one dimension of the conduit.

The method begins at block 710. At block 710, in a system having a resonance frequency and including a marine seismic source, a gas reservoir, and a conduit coupling the marine seismic source to the gas reservoir, the method includes actuating the marine seismic source at a driving frequency. Specifically, the marine seismic source actuates at a driving frequency of a voltage applied to the marine seismic source. When the marine seismic source includes an electromechanical device such as a bender or a piezoelectric component, applying electric energy to the electromechanical device may cause the marine seismic source to actuate (e.g., bend or flex) and produce acoustic energy. The marine seismic source thus actuates at a driving frequency of the voltage applied. Operation proceeds to block 720.

At block 720, the operation performed is adjusting the at least one dimension of the conduit. For example, a cross-sectional area and/or a length of the conduct may be adjusted. Operation ends at block 720.

In one embodiment of the operation at block 720, the operation may include determining an adjustment amount for adjusting at least one dimension of the conduit. In some embodiments, the adjustment amount may be determined via a lookup table. A "lookup table," as used herein, may include any array, any database, any matrix, or other similar arrangements usable to cross reference data (e.g., one or numerical values, parameters, attributes, factors, properties, etc.). Generally speaking, a lookup table may relate the values of one or more input parameters to a corresponding output value. In one embodiment, a two-dimensional lookup table may be employed for input parameters including the resonance frequency and operating water depth; the two-dimensional lookup table may relate particular values of these parameters to a corresponding amount of adjustment for at least one dimension of the conduit, such that when specific values of resonance frequency and operating water depth are input to the lookup table, the lookup table may produce a corresponding amount of adjustment for the dimension(s) of the conduit that should result in resonance at the specified input parameters.

Further, in some embodiments, a motor may be utilized to carry out the operation of adjusting at block 720. A motor coupled to a portion of the conduit may cause one portion of the conduit to move relative to another portion of the conduit. For example, the motor may cause the portions of the conduit to move up or down. In other words, adjusting the at least one dimension (e.g., a length) of the conduit is carried out via the motor coupled to the portion of the conduit. Upon at least one dimension of the conduit being adjusted, the particular resonance frequency of system 80 may change so that it more closely corresponds to the driving frequency (for example, in some cases, the adjustment may render the particular resonance frequency approximately equal to the driving frequency).

In one particular embodiment, a control system which may be included in system 80 may receive or detect information indicative of the at least one dimension of the conduit In response to receiving or detecting the information, the control system may instruct the motor coupled to the conduit to adjust the at least one dimension.

In one non-limiting embodiment of adjusting the at least one dimension of the conduit, the conduit may include two portions, one being a male portion (e.g., rendered based on a spiral channel disposed on the portion such as an open channel) and the other being a female portion (e.g., rendered based on another corresponding spiral channel disposed on the other portion). The male portion may be engaged with the female portion through, for example, an operation of a motor causing the female portion to move toward or away from the male portion. When the female portion receives the male portion, the male and female portions are generally engaged, and the two spiral channels may correspondingly engage and form a channel through which the resonating gas flow may pass. A cross-sectional area of the channel (as a result of the engagement) may be dependent of a particular engagement/separation between the male and female portions. Because the male and female portions may be engaged in various configurations, the channel would have various cross-sectional areas corresponding to the various configurations. In response to moving the female portion of the conduit relative to the male portion of the conduit (e.g., changing the engagement and/or separation between the two portions), a cross-sectional area of the conduit changes from a first cross-sectional area to a second cross-sectional area.

As an alternative or additional operation step to adjusting the cross-sectional area, a length of the conduit may be adjusted. In one embodiment, a length of the channel formed between the male and female portions may be adjusted. Similar to the cross-sectional area of the channel, other dimensions such as a length of the channel may also be dependent on the particular engagement/separation between the male and female portions. The distance traveled by the resonating gas flow in the channel may be an effective length of the channel. In response to moving the female portion of the conduit relative to the male portion of the conduit (e.g., changing the engagement and/or separation between the two portions), an effective length of the conduit changing from a first effective length to a second effective length. As a result, the particular resonance frequency of the system may change so that it corresponds to the driving frequency more closely.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The invention claimed is:

1. A system, comprising:
   a marine seismic source, the marine seismic source defining an internal cavity;
   a gas reservoir external to the marine seismic source; and
   a conduit coupled between the internal cavity of the marine seismic source and the gas reservoir;
   wherein the conduit has at least one dimension that is adjustable to change a resonance frequency of the system.

2. The system of claim 1, further comprising:
   a motor operable to move a portion of the conduit, wherein the at least one dimension is adjustable in response to the movement.

3. The system of claim 2, wherein a portion of the conduit is disposed within the gas reservoir.

4. The system of claim 1, wherein the at least one dimension includes a length of the conduit.

5. The system of claim 1, wherein the conduit includes:
a first portion; and
a second portion movably coupled to the first portion;
wherein the at least one dimension is adjustable in response to movements of the second portion relative to the first portion.

6. The system of claim 5, wherein the marine seismic source includes at least one electromechanical device operable to cause resonance in a gas flow between the marine seismic source and the gas reservoir.

7. The system of claim 1, further comprising:
a control system configured to receive information indicative of the at least one dimension of the conduit, and wherein the control system is further configured to transmit operating instructions for adjusting a portion of the conduit based on the information received.

8. An apparatus, comprising:
a first plate; and
a second plate movably coupled to the first plate;
a channel defined between the first plate and the second plate:
the apparatus configured to change at least one dimension of the channel by relative movement between the first and second plates;
the channel is configured to couple an internal cavity of a marine seismic source to an external gas reservoir.

9. The apparatus of claim 8, further comprising:
a motor that is operable to cause the movements between the first and second plates.

10. The apparatus of claim 8, wherein the channel is disposed in a spiral shape between the first and second plates.

11. The apparatus of claim 8, wherein the at least one dimension includes a cross-sectional area.

12. The apparatus of claim 8, wherein the at least one dimension includes a length dimension.

13. The apparatus of claim 8, wherein the movements between the first and second plates are operable to change the at least one dimension of the channel in a continuous manner.

14. A method, comprising:
actuating a marine seismic source at a driving frequency, the marine seismic source defines an internal cavity, and the internal cavity of the marine seismic source is coupled to a cps reservoir by way of a conduit, the gas reservoir external to the marine seismic source; and
adjusting at least one dimension of the conduit.

15. The method of claim 14, wherein the adjusting causes the resonance frequency to correspond more closely to the driving frequency.

16. The method of claim 14, wherein the adjusting is carried out via a motor coupled to a portion of the conduit.

17. The method of claim 14, wherein the adjusting includes:
moving a female portion of the conduit relative to a male portion of the conduit; and
in response to the moving, changing a cross-sectional area of the conduit from a first cross-sectional area to a second cross-sectional area.

18. The method of claim 17, wherein the adjusting further includes:
in response to the moving, changing an effective length of the conduit from a first effective length to a second effective length.

19. The method of claim 14, wherein the adjusting further comprises:
determining, via a lookup table, an adjustment amount.

20. The method of claim 14, wherein the system further includes a control system, and wherein the method further comprises:
detecting, by the control system, information indicative of the at least one dimension of the conduit; and
in response to detecting the information, the control system instructing a motor coupled to the conduit to adjust the at least one dimension.

* * * * *